United States Patent [19]
Ito et al.

[11] Patent Number: 4,953,948
[45] Date of Patent: Sep. 4, 1990

[54] REAR PROJECTION SCREEN

[75] Inventors: Akira Ito, Atsugi; Mizuo Okada, Yokohama, both of Japan

[73] Assignee: Mitsubishi Rayon Co., Ltd., Tokyo, Japan

[21] Appl. No.: 294,875

[22] Filed: Jan. 9, 1989

[30] Foreign Application Priority Data

Jan. 14, 1988 [JP] Japan .................................. 63-4985

[51] Int. Cl.$^5$ ............................................. G03B 21/60
[52] U.S. Cl. .................................................... 350/128
[58] Field of Search ................................. 350/127–129

[56] References Cited

U.S. PATENT DOCUMENTS

| 3,523,717 | 8/1970 | Glenn, Jr. ............................ 350/123 |
| 3,830,556 | 8/1974 | Bratkowski ........................ 350/128 |
| 4,432,010 | 2/1984 | Oguino ............................... 358/60 |
| 4,490,010 | 12/1984 | Honda et al. ...................... 350/128 |
| 4,509,823 | 4/1985 | Moriguchi et al. ................ 350/128 |
| 4,536,056 | 8/1985 | Oguino ............................... 350/128 |
| 4,752,116 | 6/1988 | Sekiguchi ........................... 350/128 |

FOREIGN PATENT DOCUMENTS

| 52-4932 | 1/1977 | Japan . |
| 55-130336 | 9/1980 | Japan . |
| 57-81254 | 5/1982 | Japan . |
| 57-81255 | 5/1982 | Japan . |
| 58-59436 | 4/1983 | Japan . |
| 58-108523 | 6/1983 | Japan . |
| 58-187918 | 11/1983 | Japan . |
| 58-192023 | 11/1983 | Japan . |
| 58-205140 | 11/1983 | Japan . |
| 62-254134 | 11/1987 | Japan . |
| 62-280729 | 12/1987 | Japan . |

Primary Examiner—Richard A. Wintercorn
Attorney, Agent, or Firm—Brumbaugh, Graves, Donohue & Raymond

[57] ABSTRACT

Provided is a rear projection screen formed with entrance lenses on a light receiving side of the screen and exit lenses on a light emanating side of the same for transmitting light rays from the entrance lenses to the exit lenses, wherein the central portion of the entrance lens is so shaped as to have a focal point locating on or near the exit lens surface, and the side portions of the entrance lens are so shaped as to have a focal point or points remote from the entrance lens than the focal point for the central portion.

6 Claims, 9 Drawing Sheets

IDEALLY MANUFACTURED SCREEN

FIG. 8 SCREEN HAVING ENTRANCE LENS WITH 10% FOCAL LENGTH DEVIATION

SCREEN WITH 10% TRANSVERSE DISLOCATION

REAR PROJECTION SCREEN

The present invention relates to a rear projection screen or a light transmission screen which is suitably used for rear projection TVs, microfilm readers and the like.

Rear projection screens have been widely used in order to display filmed advertisements, projected TV images, scores in games and the like. Such kinds of rear projection screens usually have predetermined shape lenses on at least either of the incidence surface or emanating surface thereof in order to increase the luminance of images on the viewing side and to enlarge its viewing angle range. Further it has been well-known that for example, lenticular lenses or fly-eye lenses formed on both sides of the screen are typically used as the above-mentioned lenses. Such screens are disclosed in, for example, Japanese Patent Laid-open No. 58-559436, Japanese Utility Model Publication No. 52-4932, Japanese Utility Model Laid-open No. 55-130336, Japanese Patent Laid-open No. 57-81254, Japanese Patent Laid-open No. 57-81255, and Japanese Patent Laid-open No. 58-108523. These references disclose a rear projection screen using convex lenticular lenses or fly-eye lenses having a cross-section which is a part of a circular elliptic or parabolic shape, a shape determined by high order expression, or the like.

Further screens having flat or polygonal surfaces as the incident surface have been practically used. However, these screens are inferior in color balance to those using convex lenticular lenses or fly-eye lenses.

Further, in a so-called projection TV which is typically shown in FIG. 5 of the accompanying drawings, three cathode ray tubes (CRT) 100, 101, 102 of red, green and blue colors are laid on a horizontal line, for projecting images through lenses 103, 104, 105 onto a screen 106 on which these images are synthesized, the red, green and blue light beams being projected at different angles to the screen. In such an arrangement, the red and blue light beams are incident upon the screen with relative angles about the green light beam as a center line. The difference in angle between these light beams is around 8 deg. in most cases at the center point of the screen. That is, as shown in FIG. 5, the angle $\theta_1$ between the green light beam and the red light beam and the angle $\theta_2$ between the green light beam and the blue light beam are about 8 deg. In this screen, the greater the offcenter deviation from the center of the screen, the greater the difference between these angle $\theta_1$, $\theta_2$ becomes. Accordingly, color tones are liable to vary in dependence upon a position at which images are observed, or in dependence upon positions on the screen. That is, the hold of the color balance is very difficult. For example, when a white color image is projected on the screen in order to be examined, the image has colors which are different from the white and are dependent upon the position from which the screen is observed. That is, a violet color is sometimes observed at a certain position on the screen. Furthermore there is possibility of reddish colors and greenish colors which are visible from one part or an entire part of the screen.

Referring to FIG. 6, one example of rear projection screens which has been designed to eliminate the above-mentioned problem concerning color balance is shown in cross-section.

In this figure, reference numeral 1 denotes elliptic entrance lenses formed on the entrance side of the rear projection screen 50, a transparent medium; 2, exit lenses formed on the viewing side thereof; 3 trapezoidal ridges formed on the exit surface of the screen at positions where no light is focused; and 4 ambient light absorbing layers formed on the top parts of the trapezoidal ridges 3. The shapes of the elliptic entrance lenses 1 and the exit lenses 2, the refractive index of the medium 50 and the arrangement of both lenses and the like are suitably selected in accordance with a desired characteristic of a screen to be used. For example, the Japanese Patent Laid-open No. 58-59436 discloses a rear projection screen in which lenticular lenses on the entrance surface thereof are each formed of a part of a convex surface extending in the direction of the major axis of the ellipses having an eccentricity equal to the inverse value of the refractive index of the lens medium, and exit lenses are each formed at a position coincident with the focal point of the abovementioned ellipse surface, remote from the entrance lenses, in the shape of an elliptic surface having an eccentricity substantially equal to the afore-mentioned eccentricity.

Referring to FIG. 7, the pattern of light rays is shown, being given by the above-mentioned rear projection screen that has a configuration in the entrance lenses and the exit lenses are theoretically arranged. The pattern of the light rays is obtained when the blue, green and red light rays R, G, B are projected onto the screen. As clearly understood from FIG. 7, the substantial part of the blue, green and red light rays is converted around the center point between the point A, B on above and below the optical axis (, and is then emitted from this, light ray converging area towards the viewing side.

The above-mentioned rear projection screens which require precise shape control configurations and the like, should have been manufactured with a high degree of accuracy. However, it is generally difficult to strictly maintain the shape and configuration of screens since the radius of curvature of the entrance and exit lenses are generally 0.3 and 0.6 mm, respectively, such as those having a shape and a configuration as shown in FIG. 6.

There are many errors in manufacture of the screens, such as errors in the thickness of the screen between the entrance and exit lenses causing aberrations in the characteristics of images, a shift between the axes of the entrance and exit lenses, and the like. Such errors in manufacture cause the following disadvantage:

FIG. 8 shows a pattern of light rays in which the focal length of the entrance lens 1 is in excess of 10% due to an error. In such a case, a part of the light rays from the entrance side has a greater incident angle to the exit lens than the critical angle which is outside of the light ray converging area between the points A and B in FIG. 7, and therefore, the light rays having the incident angles exceeding the critical angle do not emanate from the exit lens but are totally reflected toward entrance side. Such light rays give stray light causing not only the luminance but also color balance, sharpness and the like of an image to be lowered.

Further, the above-mentioned phenomenon is caused not only due to inaccuracies in the shapes of the entrance and exit lenses but also due to a longer and shorter distance between both lens than a designed distance therebetween. Further, it is also caused due to a shift between the optical axes of both lenses. If the abovementioned errors occur locally, unevenness of luminance (so-called shading) and unevenness of color would be caused, resulting in a disgraceful display.

FIG. 9 shows the pattern of light rays in which the axes of both lenses are shifted from each other by 10% of their pitches P. In such a case, total reflection due to the light rays exceeding the critical angle occurs in the area opposite to the direction in which the axes are shifted. Further, the problem of the total reflection due to the errors also occurs similarly even in a screen in which the cross-sectional shape of the exit lens is not elliptic but is given by a parabola or a higher order expression.

No effective measures have yet been practically taken to cope with deterioration in the characteristic of the screen due to the above-mentioned errors in manufacture of conventional rear projection screens. That is, in a conventional screen as mentioned above, should a slight shift be present between both front and rear surface lenses, the above-mentioned problem of total reflection occurs causing color tones, image quality and the like to be abnormal, and therefore, no satisfactory rear projection screens have yet been practically produced.

For example, in the configuration of the rear projection screen as shown in FIG. 6, even errors about 30 μm in the widthwise direction and about 30 μm in the thicknesswise direction causes practical problems if the screen has entrance lenses having pitches P which are set as P=1 mm. Accordingly a molding facility with a high degree of accuracy has been required for manufacturing the screens, and even with such a facility, the percentages of defective products has been high such that the yield thereof has not been satisfactory. Further, even if such accurate devices are provided, there remains a problem of an unacceptable percentage of defective products or an inferior yield rate. For solving the above-mentioned problems of prior arts, the present applicant has filed U.S. Patent Application No. 221,531 with filing date July 19, 1988, where special shapes of the exit lens are disclosed.

SUMMARY OF THE INVENTION

One main purpose of the present invention is to provide a rear projection screen of a both surface lenticular lens type in which no optical detrimental effects are present even though a slight shift occurs in the positional relationship between both front and rear surfaces of the screen.

This object can be achieved by the rear projection screen according to the present invention, which includes entrance lenses and exit lenses for transmitting light rays from the entrance side toward the exit side, the cross-section of each entrance lens being so shaped that the light converging characteristic of the entrance lens differs between the central portion of the lens and the side portions of the same.

DETAILED DESCRIPTION OF THE INVENTION

The present invention is based on the applicants' study of the above-mentioned problems of prior arts, i.e. the optical shading on the screen (sharp changes between light and shade occurring when viewing angle varies) and the total reflection of light rays on the exit lens. The study has suggested the following matters.

Figure 8:
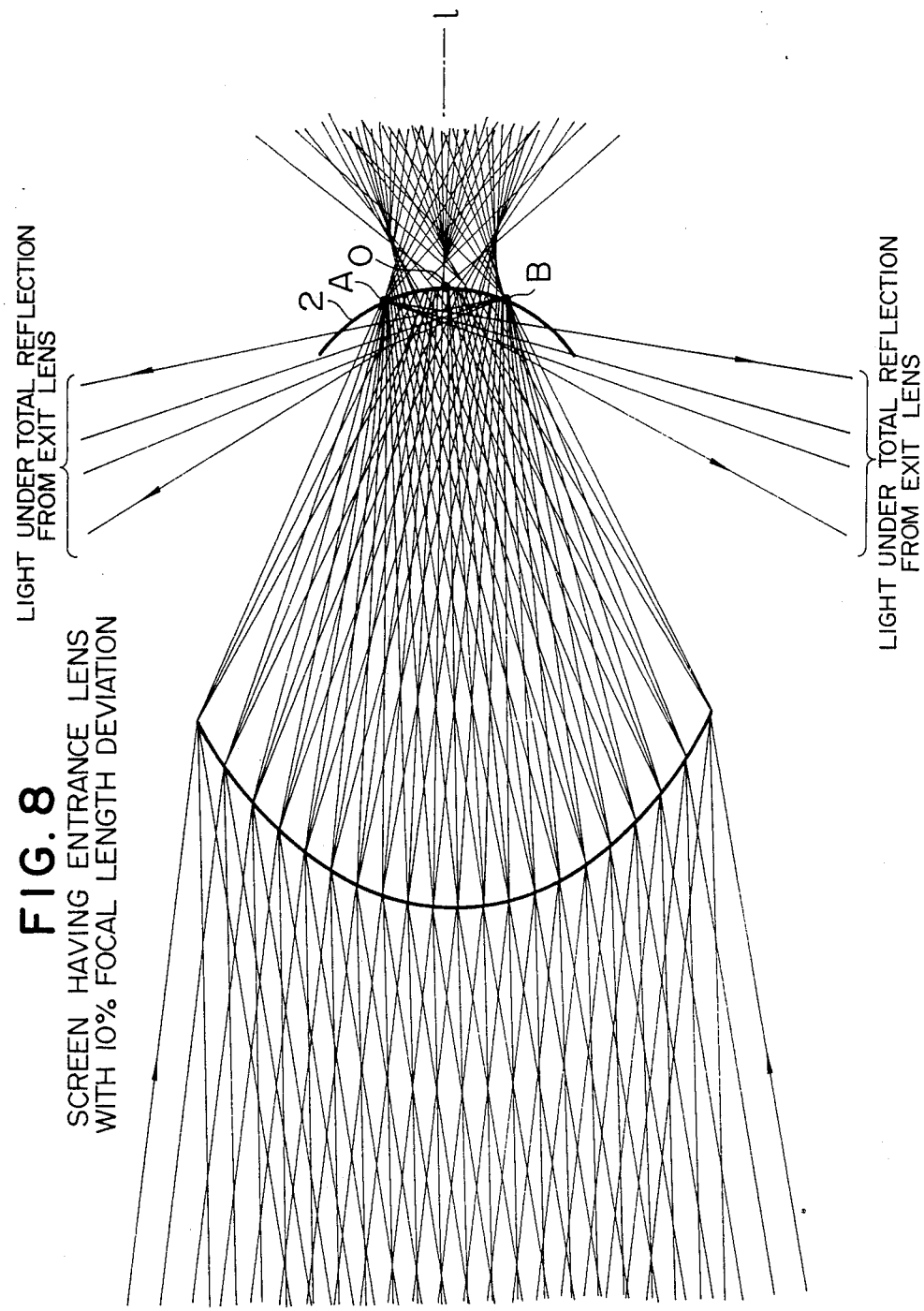
FIGS. 8 and 9 are cross-sectional views illustrating patterns of light rays when positional shifts are encountered in the screens in the lens system as shown in FIG. 6.
Figure 9:
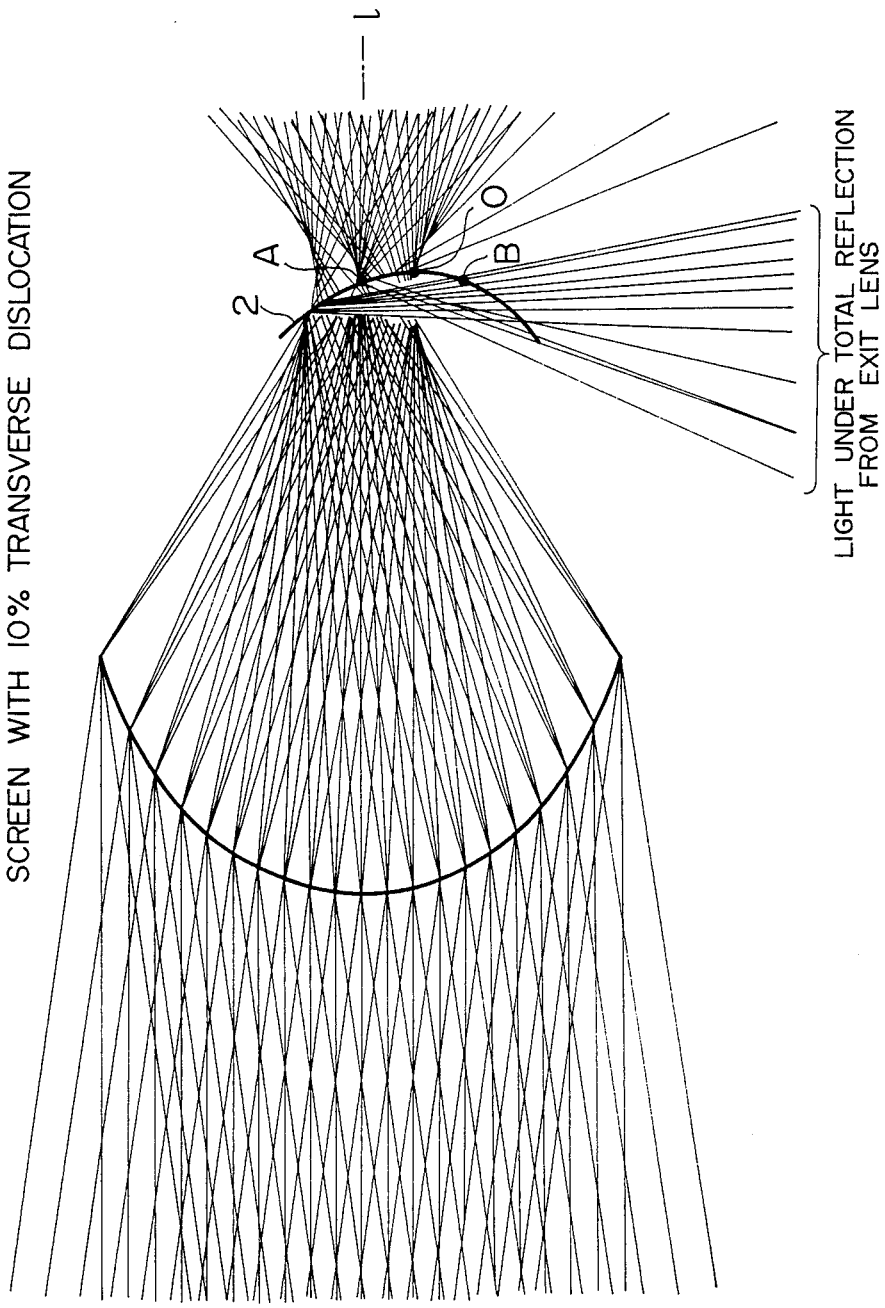
Figure 10:
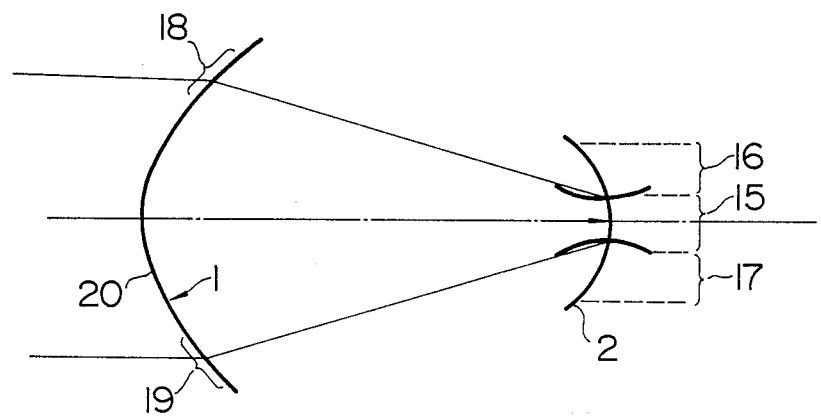
FIG. 10 is a cross-sectional view illustrating a light pattern of light rays passing through a rear projection screen of a theoretical configuration.

Referring to FIG. 10 in which a rear projection screen of a theoretical configuration is shown, light rays emanating from an exit lens 2 are converged in the focusing area 15 of the exit lens 2, and a highly accurate shape of the exit lens 2 is required in that area in order to maintain suitable color balance. Further, in a rear projection TV in which red, blue and green light beams are projected to the rear projection screen at different angles, the above-mentioned focusing area 15 is inevitably widened. The light rays which impinge upon the exit lens 2 outside of the focusing area 15 due to errors in manufacture cause the problem of shading and total reflection since these light rays are incident upon the exit lens at incident angles exceeding the critical angle of the exit lens around the focusing area 15 (those light rays correspond to the red and blue light rays which are incident upon the exit lens from the outside part of the exit lens 1 in the case of FIGS. 8 and 9). Accordingly, for preventing shading and/or total reflection, it has been considered effective to shape the cross-section of the entrance lens 1 (in FIG. 10) so as to have different light converging characteristics between the central curve portion 20 and the side curve (including straight) portions 18, 19. In detail, the light converging characteristics in the side curve portions 18, 19 are so shaped to make smaller incident angles of the light rays impinging upon the regions 16, 17 of the exit lens. This characteristic can be obtained, for example, by forming each of the side portions 18, 19 of the entrance lens as a line segment which has a smaller mean inclination to the lens axis in comparison with that of an assumed curve segment formed by extending the curve in the central portion of second order algebraic curve such as circle or ellipse. It may be preferable to shape the entrance lens so that light rays transmitted from the central portion thereof focus around a point F1 at the center point of the exit lens, and light rays transmitted from each of the side portions focus around a point further from the entrance lens than the point F1 of the central portion. This configuration assures a better color balance of image, because the side portion has a light converging characteristic similar to that of the central portion in consideration that the shape of the exit lens is always to be compatible with that of the entrance lens.

In the situation where the prevention of shading and the prevention of total reflection cannot be compatible with each other, it is preferable that the prevention of shading takes priority to that of total reflection in order to enhance the synthetic evaluation.

In the above-mentioned rear projection screen, even though the incident positions of light rays are deviated or the lenticular lenses on the front and rear sides are shifted, from each other due to manufacturing errors, or if the thickness of the screen differs from its designed value, the incident angles in the part of the exit lens where shading and total reflection are liable to occur are small in comparison with that of the conventional one. Therefore, it is possible to prevent occurrence of shading or total reflection which causes light rays to reflect back to the incident side.

The present invention will be described in detail hereinafter in the form of preferred embodiments of the present invention shown in the drawings.

Figure 1:
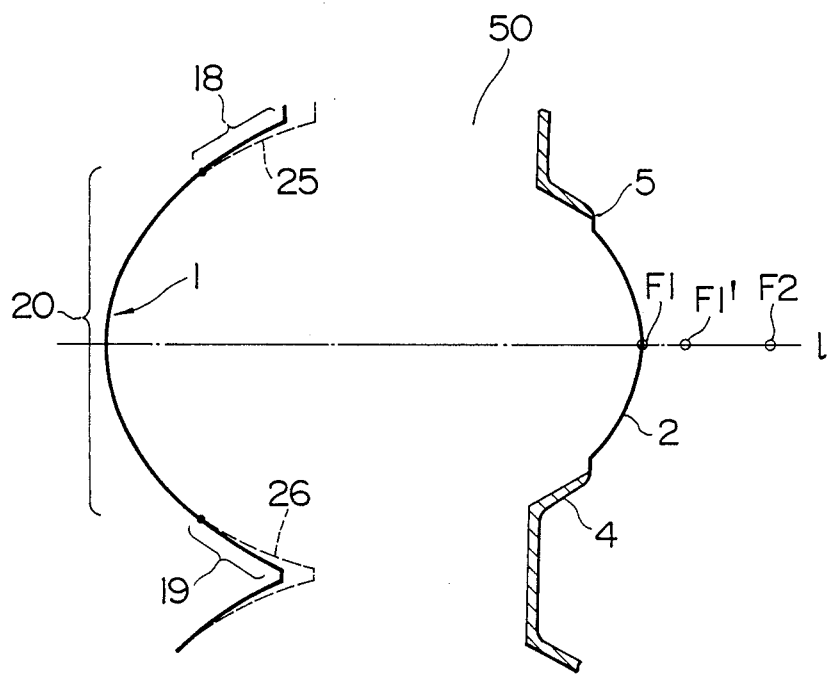
FIG. 1 is a cross-sectional view illustrating the arrangement of a rear projection screen according to the present invention.

In FIG. 1, there are shown an entrance lens 1 of substantially elliptical shape, an exit lens 2 of substantially elliptical shape, light absorbing layers 4 arranged in recess portions between the exit lenses, ridges 5 which are suitable as the boundaries of the light absorbing layers to be formed and a screen body 50.

The entrance lens 1 includes a central portion 20 and side portions 18, 19. The central portion 20 has a cross-sectional shape which can converge the light rays around a center point F1.

In addition to the center point of the exit lens, the point F1 can take a position slightly outside of the center point, such as a point F1' as shown in FIG. 1. The setting of these points F1, F2 and the relationship between them and the exit light ray characteristics are detailed in the Laid-Open Patent Publications, and therefore the explanation thereof is omitted here for the sake of brevity.

Further, in FIG. 1, broken lines 25, 26 indicate imaginary lens surfaces, assuming that the central portion 20 of the lens surface is extended. As seen in FIG. 1, the inclinations of the side portions 18, 19 are more gentle than those of the extended portions 25, 26, and the focal point of the lens side portions 18, 19 is positioned at a point F2 which is distant from the exit lens surface farther than points F1 or F1'. The focuses corresponding to the side portions 18, 19 are not required to converge into one point F2, but may be distributed among a plurality of points or along a line segment. In the embodiment shown in FIG. 1, the focal points F1, F1' and F2 are all located on the entrance lens axis 1.

The ratio between the area of the side portion 18, 19 and that of the central portion 20 is generally determined, although depending upon the purpose of use of the screen, in such a way that the joining point between the central portion and the side portion of the entrance lens is set to a position on the entrance lens at which the light rays to be incident upon the exit lens at an incident angle of more than ±30 deg. are incident. This is due to the fact that, light rays incident upon the exit lens at an incident angle of more than ±30 deg. cause a problem of shading or total reflection to be abruptly serious.

Figure 2:
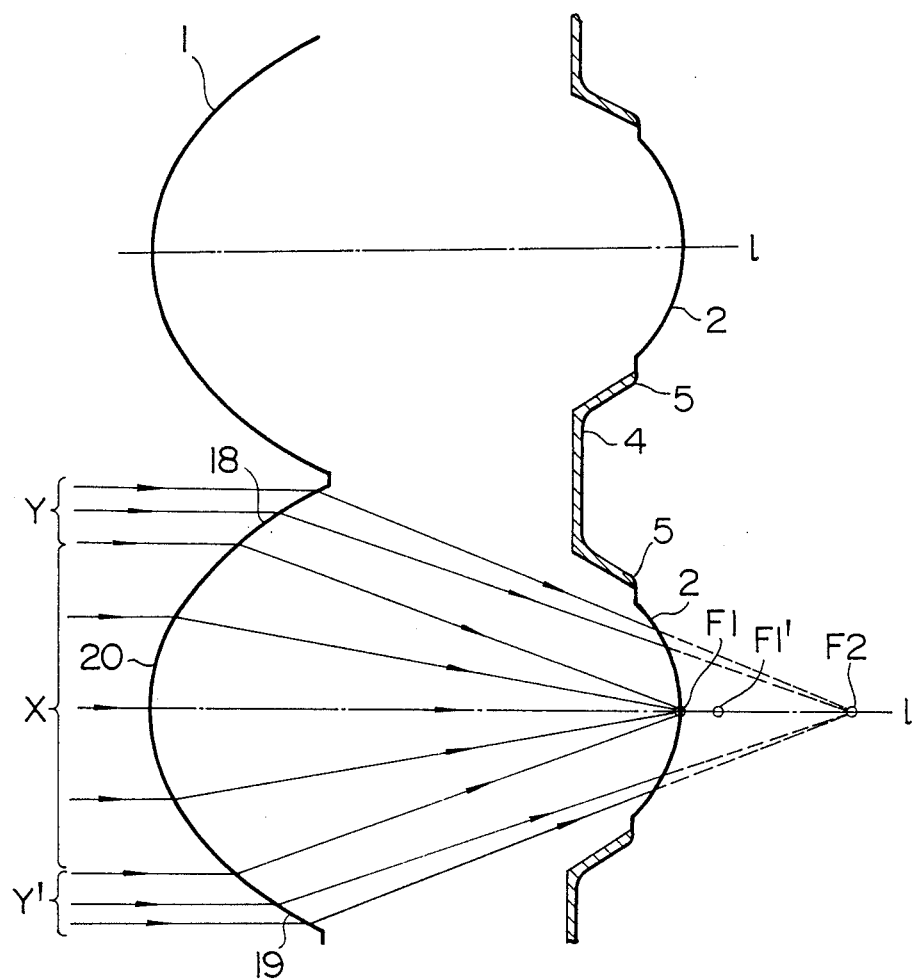
FIG. 2 is a cross-sectional view illustrating the light ray pattern in a screen according to an embodiment of the present invention.

FIG. 2 shows a light ray pattern in the screen shown in FIG. 1 where the light beams X impinging onto the central portion 20 and the light beams Y, Y' impinging onto the side portions 18, 19 are all parallel to the lens axis.

In the embodiment shown in FIGS. 1 and 2, by virtue of the above-mentioned feature of the screen, shading can be prevented and total reflection which causes the light rays to reflect back to the entrance side occurs very rarely, even when the exit axis is transversely deviated from the entrance lens axis or the thickness of the screen is different from its design value, because the light beams Y, Y' passing through the side portions 18, 19 impinge onto the exit lens surface with small incident angles.

Although elliptical shapes are used in the embodiment of FIG. 1 for forming the central portion and the side portions, other shapes such as circle, parabola or algebraic curves of higher order can be used for lenticular convex lenses or fly-eyes according to the use of the screen.

Figure 3:
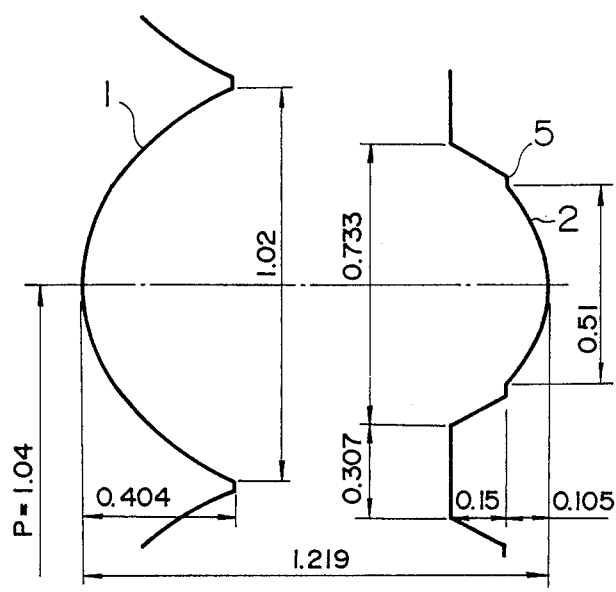
FIG. 3 is a cross-sectional view illustrating an example of main dimensions of a screen according to the present invention wherein the dimension unit is in mm.

FIG. 3 is a schematic view illustrating main dimensions of a screen made of acrylic resin according to the present invention. Each of the numerals in the figure has a unit of mm. The entrance lens surface 1 is composed of a curve approximate to a part of an ellipse having a major axial length 2.15 mm and a minor axial length 1.29 mm. Reference numeral P denotes the pitches of lenses. Further, reference numeral 5 denotes ridges.

Figure 4:
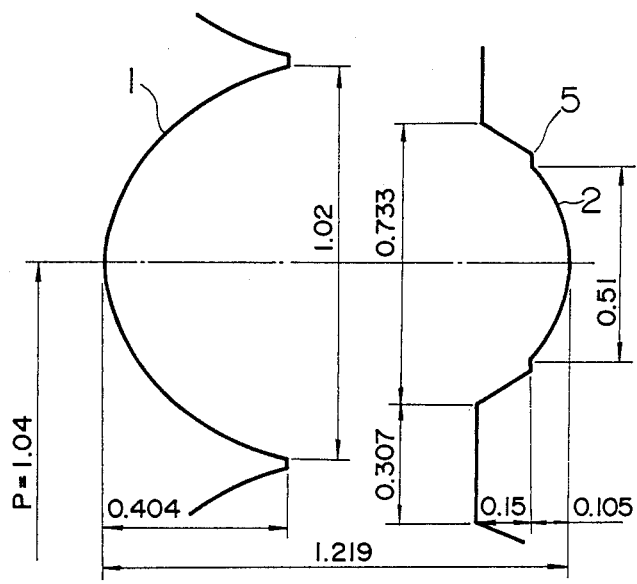
FIG. 4 is a cross-sectional view illustrating an example similar to that shown in FIG. 3 according to the prior art corresponding to the screen shown in FIG. 3.
Figure 5:
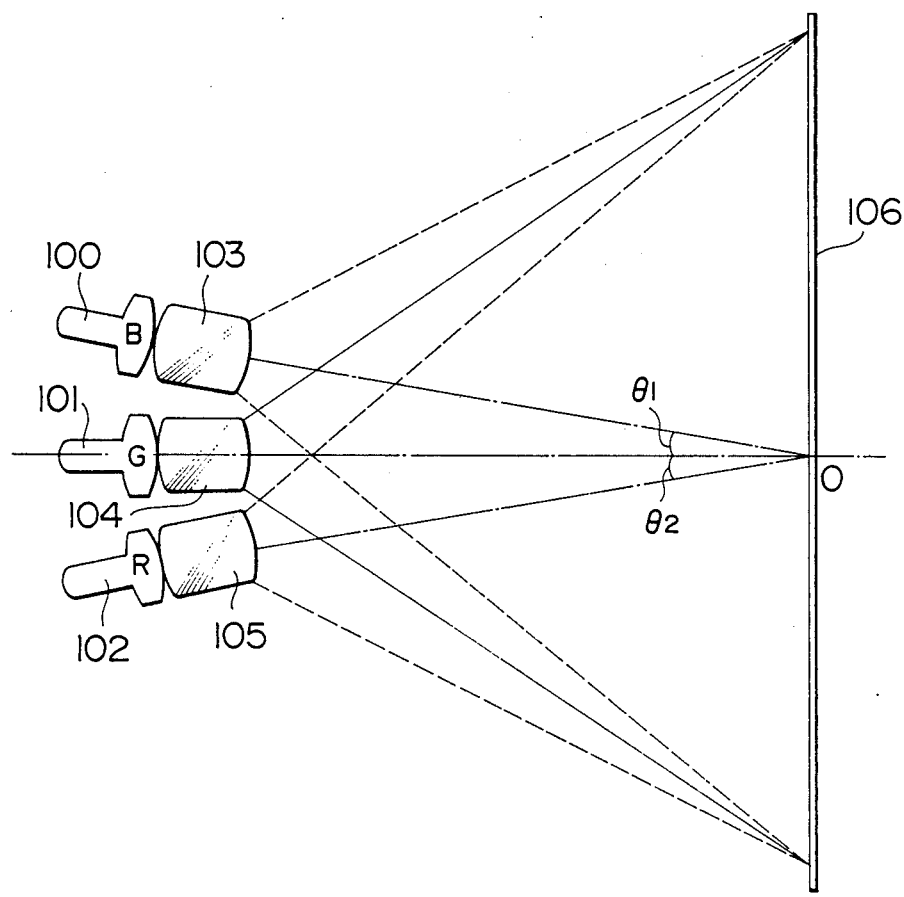
FIG. 5 is a schematic plan view illustrating a so-called projector TV of three CRT type.
Figure 6:
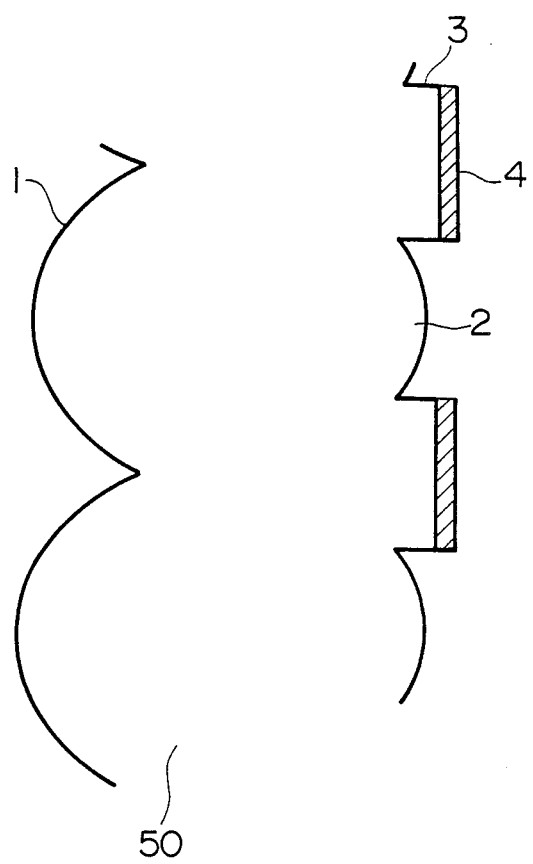
FIG. 6 is a cross-sectional view illustrating a rear projection screen which is provided with lenticular lenses on both sides of the screen.
Figure 7:
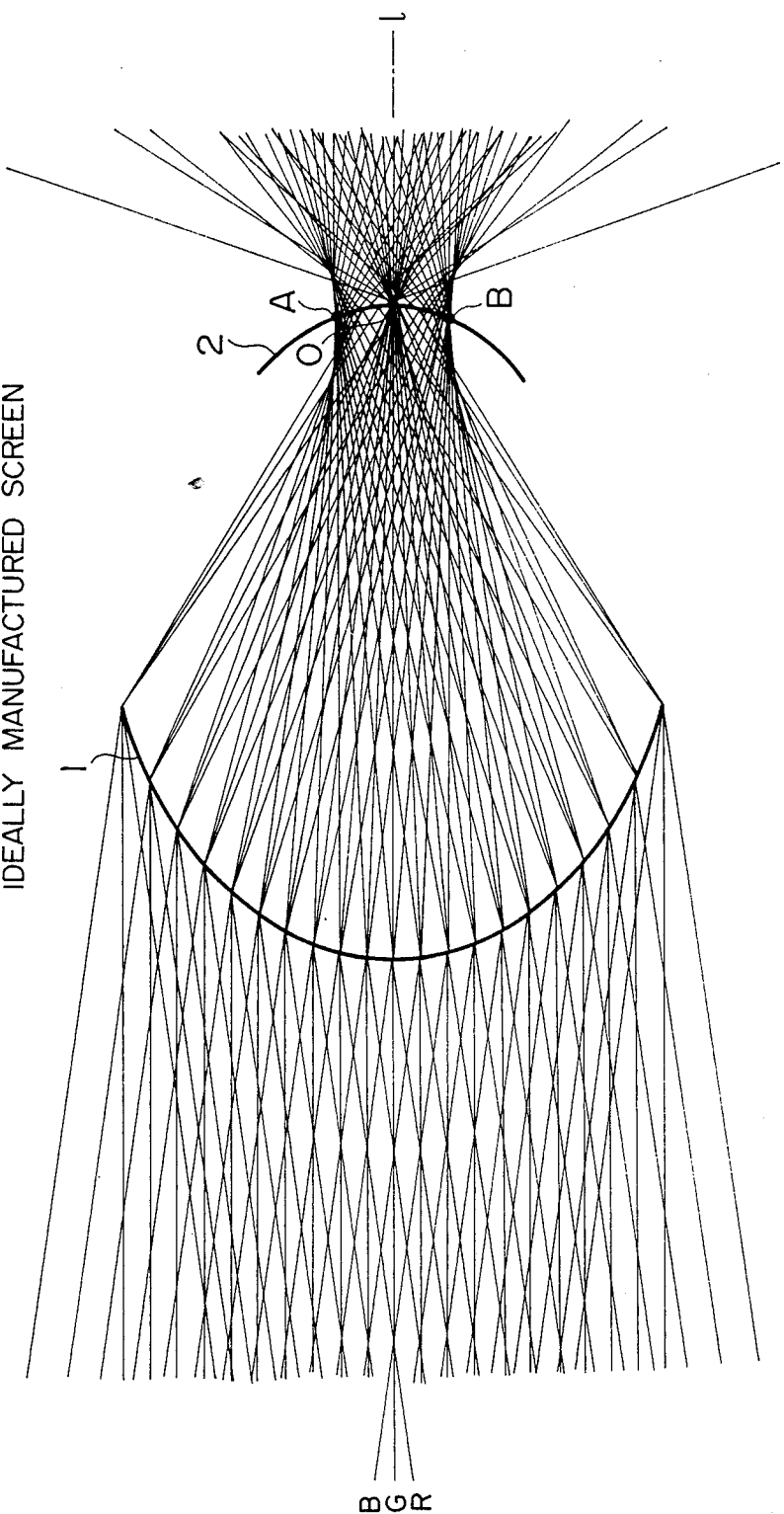
FIG. 7 is a cross-sectional view illustrating a pattern of light rays passing through a theoretical lens system in the conventional rear projection screen as shown in FIG. 6.

FIG. 4 is a view illustrating main dimensions of a screen of prior art corresponding to the screen of the present invention shown in FIG. 3. The entrance lens surface 1 is composed of a curve of a part of an ellipse having a major axial length 1.46 mm and a minor axial length 1.07 mm. The exit lens surface 2 is composed, both in the present invention and in the prior art, of a curve defined by the following even function in a range $-0.5 < X < 0.5$:

$$Y = -250.7299X^{10} + 191.4419X^8 - 50.0151X^6 + 4.3408X^4 + 0.8568X^2$$

Comparing FIG. 3 with FIG. 4, it will be understood that the entrance lenses in FIGS. 3 and 4 have the same shape in their central portions, while different shapes in their side portions. The curve in the side portion of the present invention has a greater radius of curvature but it has a gentle and a smaller inclination to the lens axis accordingly, in comparison with those of the prior art.

Table 1 shows results of an experiment carried out for investigating deterioration in grade of the screen of the present invention caused by inaccurate screen thicknesses and/or transverse dislocations between the entrance axis and the exit axis. In Table 1, $\alpha h$ denotes a horizontal viewing angle at which the screen gain is $\frac{1}{2}$, $\beta h$ denotes a horizontal viewing angle at which the screen gain is $\frac{1}{3}$, and Go denotes a screen gain obtained at a viewing angle of zero degree. Further, <$\alpha$ value> denotes an $\alpha$ value (mean value for red, green and blue light) measured in the side opposite to the deviation side and expressed as a percentage of an ideal $\alpha$ value, and <viewing angle at which G=1> denotes a viewing angle (smallest value for blue) measured in the side opposite to the deviation side and expressed as a percentage of an ideal value.

Table 2 shows an experimental results for a screen of the prior art shown in FIG. 4 obtained similarly to those in Table 1 and expressed also similarly to the same.

Comparing Table 1 with Table 2, it will be understood that both <$\alpha$ value> and <viewing angle at which G=1> are superior in the screen of the present invention to that of the prior art. In detail, the mean value of <α values> obtained at different 14 points is about 95.9 in the present invention, while about 91.7 in the prior art. The maximum deviation of <α value> from 100 is about 9.3 in the present invention, while about 16.5 in the prior art. Further, the mean value of <viewing angles at which G=1> obtained at different 14 points is about 92.4 in the present invention, while about 88.4 in the prior art. The maximum deviation of <viewing angle at which G=1> from 100 is about 13.6 in the present invention, while about 20.4 in the prior art. The greater both <α value> and the <viewing angle at which G=1>, the more inferior the screen quality become, and the greater the above-mentioned deviations, the more become the light quantity loss caused by manufacturing errors in screen thickness, in alignment of lens axes, and so on, thereby causing partial declines of the screen gain, i.e. a shading phenomenon. From the description above, it would be understood that the present invention provides an excellent rear projection screen which has wider tolerances for manufacturing errors of the above-mentioned kinds and a narrower dispersion of the screen quality under a usual manufacturing process in comparison with screens of prior arts.

Although the invention has been described in its preferred embodiments, it is to be understood that the invention is not limited by the described embodiments, but may be embodied in various forms within the scope of the claims. For example, it is in the scope of the present invention to provide the screen with exit lenses which are shaped as disclosed in U.S. Patent Application No. 221,531 filed on July 19, 1988.

Further, although, in the above-mentioned embodiment of the present invention, it has been explained such that the screen is made of acrylic resin, other materials such as polyvinyl chloride resin, polycarbonate resin or any transparent synthetic resin can be used. Some light diffusing means can be applied to these screen materials. For example, inorganic pigments such as $SiO_2$, $CaO_3$, $Al_2O_3$, $TiO_2$, $BaSO_4$, $ZnO$ or glass powder, or organic pigments can be added to the material, or matte finished surface can be formed on the entrance lens surface and/or on the exit lens surface.

As mentioned above, the rear projection screen according to the present invention has wider tolerances for inaccurate relative positions between the entrance lens and the exit lens. The tolerance may be possibly widened by several times in comparison with that of prior arts, although the degree of the ratio depends on the shape of the lenticular lenses. Further, in the present invention, the widened tolerance can be obtained without causing any shading or deterioration of color balance.

Further, the present invention has an additional advantage that the life of the metal dies become longer, because the inclinations of the side portions of the entrance lens towards the lens axis are more gentle.

TABLE 1

<PRESENT INVENTION>

| | +5% in thick. disloc. = 0 | | +5% in thick. disloc. = 3% | | +5% in thick. disloc. = 5% | |
|---|---|---|---|---|---|---|
| <α value> | view. ang. at G = 1 | <α value> | view. ang. at G = 1 | <α value> | view. ang. at G = 1 |
| 99.4 | 95.5 | 94.0 | 93.2 | 90.7 | 90.9 |
| | +3% in thick. disloc. = 0 | | +3% in thick. disloc. = 3% | | +3% in thick. disloc. = 5% | |
| <α value> | view. ang. at G = 1 | <α value> | view. ang. at G = 1 | <α value> | view. ang. at G = 1 |
| 99.7 | 95.5 | 94.6 | 95.5 | 91.6 | 90.9 |
| ideal screen | View. Ang. = 44 deg. at G = 0 | +0% in thick. disloc. = 3% | | 0% in thick. disloc. = 5% | |
| αh = 33.4 deg. | view. ang. at G = 1 | <α value> | view. ang. at G = 1 | <α value> | view. ang. at G = 1 |
| βh = 95.0 deg. | 100.0 | 95.8 | 90.9 | 92.8 | 88.6 |
| Go = 3.3 | | | | | |
| <α value> | | | | | |
| 100.0 | | | | | |
| | −3% in thick. disloc. = 0 | | −3% in thick. disloc. = 3% | | −3% in thick. disloc. = 5% | |
| <α value> | view. ang. at G = 1 | <α value> | view. ang. at G = 1 | <α value> | view. ang. at G = 1 |
| 100.3 | 97.7 | 96.7 | 90.9 | 94.0 | 88.6 |
| | −5% in thick. disloc. = 0 | | −5% in thick. disloc. = 3% | | −5% in thick. disloc. = 5% | |
| <α value> | view. ang. at G = 1 | <α value> | view. ang. at G = 1 | <α value> | view. ang. at G = 1 |
| 100.6 | 97.9 | 97.3 | 90.9 | 94.9 | 86.4 |

*1 <α value> denotes α value (mean value for red, green and blue colors) measured in the side opposite to the deviation side and expressed as a percentage of an ideal α value.
Mean value for 14 points ≈ 95.9, Max. difference 100 − 90.7 ≈ 9.3
*2 <Viewing angle at G = 1> denotes a viewing angle (smallest value for blue) measured on the side opposite to the deviation side and expressed as a percentage of an ideal value.
Mean value for 14 points ≈ 92.4, Max. difference 100 − 86.4 = 13.6

TABLE 2

<COMPARISON EXAMPLE>

| | +5% in thick. disloc. = 0 | | +5% in thick. disloc. = 3% | | +5% in thick. disloc. = 5% | |
|---|---|---|---|---|---|---|
| <α value> | view. ang. at G = 1 | <α value> | view. ang. at G = 1 | <α value> | view. ang. at G = 1 |
| 97.8 | 93.9 | 88.0 | 85.7 | 83.5 | 79.6 |
| | +3% in thick. disloc. = 0 | | +3% in thick. disloc. = 3% | | +3% in thick. disloc. = 5% | |
| <α value> | view. ang. at G = 1 | <α value> | view. ang. at G = 1 | <α value> | view. ang. at G = 1 |
| 99.5 | 93.9 | 89.6 | 83.7 | 84.8 | 81.6 |
| ideal screen | View. Ang. = 49 deg. at G = 1 | +0% in thick. disloc. = 3% | | 0% in thick. disloc. = 5% | |
| αh = 37.6 deg. | view. ang. at G = 1 | <α value> | view. ang. at G = 1 | <α value> | view. ang. at G = 1 |
| βh = 45.0 | 100.0 | 91.8 | 89.9 | 86.7 | 83.7 |
| Go = 3.3 | | | | | |
| <α value> | | | | | |
| 100.0 | | | | | |
| | −3% in thick. disloc. = 0 | | −3% in thick. disloc. = 3% | | −3% in thick. disloc. = 5% | |
| <α value> | view. ang. at G = 1 | <α value> | view. ang. at G = 1 | <α value> | view. ang. at G = 1 |
| 98.7 | 100.0 | 93.4 | 91.8 | 88.6 | 85.7 |

TABLE 2-continued

<COMPARISON EXAMPLE>

| | −5% in thick. disloc. = 0 | | −5% in thick. disloc. = 3% | | −5% in thick. disloc. = 5% |
|---|---|---|---|---|---|
| <α value> | view. ang. at G = 1 | <α value> | view. ang. at G = 1 | <α value> | view. ang. at G = 1 |
| 97.9 | 93.9 | 94.1 | 89.9 | 89.6 | 83.7 |

<α value>
Mean value for 14 points ≈ 91.7, Max. difference = 100 − 83.5 = 16.5.
<View. Ang. at G = 0>
Mean value for 14 points = 88.4, Max. difference 100 − 79.6 = 20.4.

What is claimed is:

1. In a rear-projection screen having an entrance side and an exit side, said screen being formed with a plurality of entrance lenses on said entrance side each having a center portion and side portions at both sides of said center portion, and having a plurality of exit lenses corresponding to said entrance lenses formed on said exit side, and wherein light rays incident upon said entrance lenses are emitted from said exit lenses, the improvement wherein each of said entrance lenses has a cross-section defined by a line having a center part corresponding to said center portions and side parts corresponding to said side portions, said center part and said side parts of said line having respective light converging characteristics which are different from each other, wherein said center part of said line is defined by a secondary order algebraic curve, and wherein the inclination of said side parts of said line is more gentle than that of said center part.

2. A rear projection screen as set forth in claim 1, wherein said center portion of each entrance lens is formed so that light rays incident thereupon are converged at a first point on and in the vicinity of its associated exit lens, and wherein said side portions of each entrance lens are so formed that light rays incident thereupon are converged at a point more distant from said entrance lens than said first point.

3. A rear projection screen as set forth in claim 2, wherein said center portion and said side portions of each entrance lens are joined at a position on said entrance lens at which light rays to be incident upon its associated exit lens at an incident angle of more than ±30 degrees are incident.

4. A rear projection screen as set forth in claim 1, wherein the center part of the line which defines said center portion of each entrance lens is in the form of a curve selected from the group of curves consisting of a part of a circle, an ellipse, a parabola and a higher order algebraic curve.

5. A rear projection screen as set forth in claim 1, wherein each of said exit lenses has a light converging area and an area outside of said light converging area, said light converging area and said outside area having respective cross-sectional shapes such that the inclination of said light converging area is gentle as compared with that of said outside area when said exit lens and its associated entrance lens are dislocated from each other.

6. In a rear-projection screen having an entrance side and an exit side, the entrance side of said screen being formed with a plurality of entrance lenses each having a center portion and side portions at both sides of said center portion, the exit side of said screen being formed with a plurality of exit lenses corresponding to said entrance lenses, and light rays incident upon said entrance lenses are emitted from said exit lenses, the improvement wherein each of said entrance lenses has a cross-section defined by a line having a center part corresponding to said center portion and side parts corresponding to said side portions, said center part and said side parts of said line having respective light converging characteristics which are different from each other, wherein said center portion and said side portions of each entrance lens are joined at a position on said entrance lens at which light rays to be incident upon its associated exit lens at an incident angle of more than ±30 degrees are incident.

* * * * *